United States Patent [19]

Gould et al.

[11] Patent Number: 4,780,512

[45] Date of Patent: Oct. 25, 1988

[54] POLYURETHANE ACRYLATE COMPOSITIONS

[75] Inventors: Francis E. Gould, Princeton; Christian W. Johnston, Neshanic Station, both of N.J.

[73] Assignee: Tyndale Plains-Hunter Ltd., Princeton, N.J.

[21] Appl. No.: 107,286

[22] Filed: Oct. 9, 1987

Related U.S. Application Data

[63] Continuation-in-part of Ser. No. 443,267, Nov. 22, 1982, abandoned.

[51] Int. Cl.[4] .............................................. C08L 75/04
[52] U.S. Cl. .................................... 525/454; 525/455; 521/905
[58] Field of Search ................................. 525/454, 455

[56] References Cited

U.S. PATENT DOCUMENTS 3,297,745  1/1967  Fekete et al. ..................... 525/920
4,359,558  11/1982  Gould et al. ...................... 525/455

Primary Examiner—Lewis T. Jacobs
Assistant Examiner—A. Carrillo
Attorney, Agent, or Firm—Ratner & Prestia

[57] ABSTRACT

Polyurethane acrylate compositions are obtained by reacting 100 parts of a hydrophilic polyurethane resin in the presence of from about 10 to about 50 parts of an acrylate. The resulting products will form a hydrogel upon immersion in water and are permeable to gases, ions and other low molecular weight species. The hydrophilic polyurethane acrylate compositions may be molded to form shaped products that swell in water and have a variety of uses.

12 Claims, No Drawings

POLYURETHANE ACRYLATE COMPOSITIONS

This application is a continuation-in-part of application Ser. No. 443,267, filed Nov. 22, 1982, now abandoned.

This invention relates to hydrophilic polyurethane acrylate compositions. More particularly, the present invention relates to compositions obtained by the reaction of one or more acrylates in the presence of one or more hydrophilic polyurethanes that may be obtained by the reaction of a polyalkylene glycol with a diisocyanate.

In patent application Ser. No. 206,407, filed Nov. 12, 1980 now U.S. Pat. No. 4,359,558 dated Nov. 16, 1982, are described polyurethane diacrylate compositions which are substantially isoluble in alcohol such as ethanol and methanol. The hydrophilic polyurethane arrylate compositions of the present invention will form a hydrogel upon immersion in water and are permeable to gases, ions and nonionic materials of various molecular weights. Unlike the hydrophilic polyurethane diacrylate compositions, however, they are soluble in alcohol.

The hydrophilic polyurethane acrylate compositions of the present invention may be prepared by reacting an acrylate in the presence of one or more hydrophilic polyurethanes. A free radical catalyst may be present to initiate the reaction of the acrylate.

The hydrophilic polyurethanes that are employed as one component of the present invention may be made by the reaction of:

(A) one or more diols having a number average molecular weight in the range of from about 106 to 20,000, selected from the group consisting of:
 (a) diethylene glycol,
 (b) long-chain polyoxyalkylene diols, and
 (c) dialkanol amines, with (B) a urethane precursor selected from the group consisting of organic polyisocyanates and nitrile carbonates in the presence of an organic tin catalyst. If desired, a polyfunctional lactone having the formula:

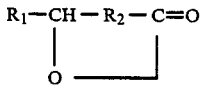

wherein $R_1$ is a monovalent radical selected from the group consisting of —H, —CH$_2$NH$_2$, —SO$_2$CH$_3$, —CHOHCOOH, and —(CHOH)$_n$CH$_2$OH; n being an integer form 0 to 5; and $R_2$ is a divalent radical —(-CHOH)$_{\overline{m}}$; m being an integer from 2 to 10; and ethers derived from said lactones; may be added in amounts of from 0.1% to 30% of weight of the total reaction mixture. Polyurethane resins containing such polyfunctional lactones are described in U.S. Pat. Nos. 4,156,066 and 4,156,067.

The hydrophilic polyurethane component which is present with the monoacrylate at the time of its reaction contains diethylene glycol and a long-chain diol. The long-chain diols should have a molecular wieght of at least about 106 and preferably 1450 to 7500. Suitable diols consist predominately of oxyethylene or oxypropylene groups, though a minor priportion of other oxyalkylene groups may be included.

The polyisocyanate used to make the first component of the present invention may be represented by R(NCO)$_n$ wherein n is greater than 1, preferably 2-4, and R is an aliphatic, alicyclic, aliphatic-alicyclic, aromatic, or aliphatic-aromatic hydrocarbon compound of from 4 to 26 carbon atoms, but more conventionally from 6 to 20 generally from 6 to 13 carbon atoms. Representative examples of the above isocyanates are: tetramethylene diisocyanate; hexamethylene diisocyanate; trimethylhexamethylene diisocyanate; dimer acid diisocyanate; isophorone diisocyanate; diethylbenzene diisocyanate; decamethylene 1,10-diisocyanate; cyclohexylene 1,2-diisocyanate and cyclohexylene 1,4-diisocyanate and the aromatic isocyanate such as 2,4-and 2,6-tolylene diisocyanate; 4,4-diphenylmethane diisocyanate; 1,5-naphthalene diisocyanate; dianisidine diisocyanate; tolidine diisocyanate; a polymeric polyisocyanate such as neopentyl tetra isocyanate; m-xylylene diisocyanatet; tetrahydronaphthalene-1,5 diisocyanate; and bis(4-isocyanatophenyl) methane.

The preferred isocyanate is methylene di(cyclohexyl isocyanate). Other but slightly less preferred diisocyanates are trimethyl hexamethylene diisocyanate and isophorone diisocyanate.

Other compounds which are useful are the isocyanate equivalents which produce the urethane linkage such as the nitrile carbonate, that is, the adiponitrile carbonate of the formula:

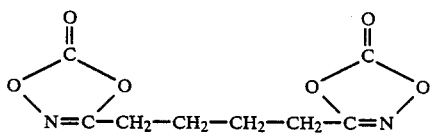

In the manufacture of the hydrophilic polyurethane resin component of this invention, low molecular weight glycols such as diethylene glycol and dipropylene glycol or an aromatic glycol may be added to the reaction mixture. The preferred low molecular weight aromatic polyols are bisphenol A and 4,4'-sulfonyldiphenol.

The proportions in which the longchain polyglycol and the low molecular weight polycol, that is, diethylene glycol are present in the hydrophilic polyurethane component of this invention depends on the hydrophobic-hydrophilic balance present in each and desired in the final composition. Increasing the molecular weight of the long-chain polyoxyethylene glycol and/or the amount of this polyol contributes strong hydrophilic properties to the final product. This effect may be counterbalanced by increasing the proportion of low molecular weight glycol, that is, diethylene glycol or dipropylene glycol.

The diols and urethane precursor are reacted in relative amounts effective to provide resinous products having NCO/OH ratios of from 0.85/1 to 1/1, preferably 0.9/1 to 0.98/1 and number average molecular weights of about 18,000 to 24,000.

Keeping the above in mind that it is the number of polyethylene oxide groups in the polymer molecular that determines hydrophilic properties, it is a simple matter to choose mixtures of reactions such that the hydrophilic polyurethane to be present at the time of reacting the acrylate will have the desired properties. By choosing the molecular weight of the polyethylene glycol or using two polyalkylene glycols of different molecular weight one may "tailor make" the hydrophilic polyurethane component to satisfy a wide range of properties. It will be understood that the term "hdyrophilic polyurethanes" as used throughout the specification and claims is used to describe polyurethanes which form hydrogels through hydrogen bonding and which take up at least 20 weight percent water when immersed in water. Moreover, the hydrophilic polyurethane acrylate compositions of the present invention, like the hydrophilic polyurethane component also form hydrogels when immersed in water that take up at least 20 weight percent water.

As mentioned above, the hydrophilic polyurethane component that is reacted with acrylate to form the compositions of the present invention may contain a polyfunctional lactone. Representative examples of the polyfunctional lactones are those derived from polysaccharides and monosaccharides such as mannolactone, delta gluconolactone, sorbolactone and D-glucuronolacton.

It is desirable that the lactones employed have at least 3 and preferably 4 or more hydroxyl groups in the molecule or at least 1 more than is required to form a linear polyurethane chain. The free (unreacted) hydroxyl groups remain in the polymer backbone and are available for crosslinking the polymer. The lactone ring is also reactive and may be opened, that is, by hydrolysis, to form carboxylate groups or carboxyl groups in the polymer backbone.

In making the first component of the present invention, the glycols are mixed with the lactone, if present, and the polyisocyanate is reacted with the mixture although other techniques may be used. The reaction is catalyzed by known catalyst for such reaction, suitable ones being tin salts and organic tin esters such as dibutyl tin dilaurate, tertiary amines such as triethyl diamine (DABCD), N,N,N',N'-tetramethyl-1,3-butane diamine and other recognized catalyst for urethane reactions which are well known in the art. The reaction can be conducted in the absence or presence of diluent or solvent.

The second component of the composition of the present invention is an acrylate. When used throughout the specification and claims the term "acrylate" shall mean and be the monoacrylic or monomethacrylic ester of an alcohol having less than 13 carbon atoms which may be made by combining one mole of acrylic or methacrylic acid with one mole of an alcohol. The preferred acrylates are hydroxyethyl methacrylate, methyl methacrylate and methyl acrylate although other esters of acrylic and methacrylic acid may be use.

In preparing the hydrophilic polyurethane acrylate composition of the present invention, 100 parts by weight of one or more polyurethanes are preferably dissolved together with from about 10 to about 50 parts of weight of one or more acrylates in a solvent such as methanol or 95% ethanol and a free radical catalyst is added to initiate polymerization of the acrylate. The solution of the two components may be cast to form a film and heat curled at temperatures in the range of 110° C. to 135° C. or alternatively, the cast film may be cured by the action of ultraviolet light. If insolubilization of the two component composition is to be initiated by ultraviolet light, it is not necessary that the free radical catalyst be present. It may be desirable, however, to add an ultraviolet absorber such as Rhodamine B or an azo type catalyst such as azo bis-isobutyl nitrile to the mixture of the two components.

If it is desired to prepare shaped articles or tubing from the hydrophilic polyurethane acrylate compositions of the present invention, the solvent may be removed under reduced pressure and the residual mixture can be molded at temperatures of 110° C. to 135° C. for from about 20 to about 60 minutes to cure the hydrophilic polyurethane acrylate composition.

The hydrophilic polyurethane acrylate compositions of the present invention absorb water and the amount of water that is absorbed may be varied by the nature of the hydrophilic polyurethane present and by the amounts and types of acrylate present in the composition.

The above described hydrophilic polyurethane acrylate resin compositions are also useful as coatings, molding compounds, absorbents, controlled release agents, ion exchange resins, in dentistry, and in the manufacture of dialysis membranes, cannulae, contact lenses, packaging components, desalination membranes, burn dressings, contraceptive devices, sutures, surgical implants, blood oxygenators, intrauterine devices, vascular prostheses, oral delivery systems, battery separator plates, eye bandages, corneal prostheses, anti-fog coatings, surgical drapes, oxygen exchange membranes, artificial finger nails, finger cots, adhesives, gas permeable membranes, and in protective and drag resistant coatings.

The practice of the invention is further illustrated by the following examples without being restricted thereto, the parts being by weight, unless otherwise stated.

EXAMPLE I

A polyurethane polymer is prepared by melting together in a container 822.3 parts of CARBOWAX 8,000 ® (a polyethylene glycol having a number average molecular weight of 8,000 manufactured by Union Carbide Corporation, New York, N.Y. 10017), 23.0 parts of diethylene glycol, 5.4 parts of water. The mixture becomes clear at about 80° C. and is cooled to 75° C. When the temperature reaches 75° C., 149.7 parts of methylene biscyclohexyl-4,4'-isocyanate (a product identified as DESMODUR W ® by the Mobay Chemical Corporation, Penn Lincoln Parkway West, Pittsburgh, Pa. 15205). The mixture is stirred at 75° C. for 15 minutes, cooled to 50° C. and then there is added 2.0 parts by volume of an organic tin catalyst, dibutyl tin dilaurate (a product identified as $T_{12}$ (manufactured by Metal and Thermite Company of Rahway, N.J.). The catalyst is added and the reaction mixture is allowed to exotherm from 50° C. to 75° C. The molten product is poured at a temperature of 75° C. into polypropylene pans and heated in an oven at 100° C. to complete the reaction and form a foamed hydrophilic polyurethane product having a number average molecular weight of about 19,600. When immersed in water, 100 parts of this product will absorb 470 parts of water, (water uptake 470%).

The polyurethane product is cooled to room temperature, removed from the pans and dissolved in 95% ethanol to give a solution containing 9.82% by weight solids. To 305.5 parts of this polyurethane solution in ethanol is added with stirring 6.0 parts of hydroxyethyl methacrylate and 0.427 parts by volume of tert butyl peroctoate. The solvent is evaporated at room temperature under vacuum to give a product containing 100 parts of hydrophilic polyurethane and 20 parts of hydroxyethyl methacrylate, that is subsequently cured at a temperature of 121° C. for 20 minutes. This product, after curing, takes up 408%–428% water and exhibits 70%–75% elongation.

EXAMPLE II

A contact lens may be prepared by spinning from solution. The mixture of 305.5 parts of polyurethane solution in ethanol, 6.0 parts of hydroxyethyl methacrylate and 0.427 parts by volume of tert butyl peroctoate described above in Example I, is evaporated under vacuum to increase the solids content until the solution viscosity reaches 12-15 poise (approximately 11%-12% non-volatile).

A concave mold conforming to the desired shape of the convex side of a contact lens is mounted on a vertical shaft that can be rotated at a top speed of 200 rpm. The concave portion of the mold is half filled with the 12-15 poise solution. The mold is slowly started and brought to top speed over 5 minutes. It is allowed to spin at top speed for an additional 5 minutes. The spinning mold is allowed to come to rest.

The mold is then placed in an oven with a nitrogen atmosphere. The temperature is allowed to raise slowly to 125° C. and is maintained for 20 minutes. After cooling, the mold is placed in water and the polymer hydrates and becomes separated from the mold.

If desired, the polyurethane-hydroxyethyl methacrylate composition described above in Example I may be mixed with, or used to encapsulate drugs prior to the curing step. Drugs that may be dispersed in this manner are, for example, vitamins, hormones, steroids, drug protagonists and anti-tubercular drugs.

The cured polymer will slowly release the drug when placed in an aqueous or saline solution of in body fluids. The resin composition described in this Example, therefore, may be formed into any convenient shape, for example, tablets for oral ingestion, implants, intrauterine devices, diaphragms and suppositories to provide a controlled release of the drug. If desirable, a contraceptive such as lactic acid may be added to the diaphragm or contraceptive during manufacture.

EXAMPLE III

To 305.5 parts of the 9.82% ethanol solution containing 30 parts of a hydrophilic polyurethane resin described in Example I above is added 6.0 parts of methyl acrylate and 0.427 parts of tert butyl peroctoate. The solvent is evaporated at room temperature under vacuum to give a product comprising 100 parts of hydrophilic polyurethane and 20 parts of methyl acrylate.

This product may be cured in various shapes by heating in an oven at 121° C. for 30-60 minutes under nitrogen. The cured polyurethane methyl acrylate composition will take up from 716%-758% water and has about 112% elongation.

Alternatively, the polyurethane-methyl acrylate composition may be pressed into the form of a flat sheet or a contact lens by heating under pressure in a press at 100° C. and increasing the temperature to 130° C. for 2 minutes while maintaining the pressure. The sheet may be used as a membrane for water and vapor transmissions and has medical applications as a surgical drape (which may be coated on one side with an adhesive) as it is particularly advantageous as a burn dressing into which medicaments such as sulfadiazine may be incorporated. The polyurethane-acrylate composition (containing as little as 10 weight percent methyl acrylate is useful as a dialysis membrane and finds application in separation techniques.

EXAMPLE IV

A polyurethane methyl methacrylate composition is made by the method described in Example I above from the following mixture:
Hydrophilic polyurethane (9.8% ethanol solution of Example I): 305.5 parts
Methyl methacrylate: 6.0 parts
Tert butyl peroctoate: 0.432 parts The solution may be evaporated to dryness to room temperature under vacuum to give a produce which may be extruded under heat and pressure to produce a hydrophilic canula having desirable physical properties. If desired a medicament may be incorporation with the resin prior to extrusion. The polyurethane acrylate composition of the Example (in ethanol solution) may also be employed to coat a preformed canula and cured at a temperature of 120° C. following evaporation of the solvent.

When the above composition is cured in an oven with an inert atmosphere at 201° C. for 30 minutes, the resulting product will take up 726% water and has an elongation of 111%.

Cured cast or molded films that are useful as wound dressings and will slowly release iodine may be prepared from the resin composition of this Example by incorporating in the polyurethane-methyl methacrylate composition, after curing, iodine.

EXAMPLE V

To the solution of 305.5 parts of hydrophilic polyurethane (9.82% solids), 6 parts of hydroxyethyl methacrylate, and 0.427 parts of tert butyl perotoate in ethanol described above in Example I, may be suspended 3% by weight of mercurous acetate and 1% by weight bee's wax (based on resin solids). This solution can be applied to the hull of a boat and will be cured by the actinic rays of the sun to form an insoluble coating which will decrease drug resistance and inhibit marine growth by the slow release of mercury.

EXAMPLE VI

The solution of 305.5 parts of hydrophilic polyurethane (9.82% solids), 6 parts of hydroxyethyl methacrylate, and 0.427 parts of tert butyl peroctoate in ethanol described above in Example I is heated at room temperature under vacuum to remove the ethanol. The resulting white solid may be extruded at temperatures below the curing temperature under pressure to form tubing which is subsequently cured and is water and gas permeable. Such tubing is useful in kidney dialysis equipment.

We claim:

1. A hydrophilic polyurethane acrylate composition which is alcohol soluble will form a hydrogel upon immersion in water and is permeable to gases, ions and nonionic materials of various molecular weights, said composition comprising about 100 parts by weight of a hydrophilic polyurethane resin having an NCO/OH ratio of 0.85/1 to 1/1 and from about 10 to about 50 parts by weight of a monoacrylate whererin said monoacrylate is a monoacrylic or monomethacrylic ester of an alcohol having less than 13 carbon atoms.

2. The hydrophilic polyurethane acrylate composition of claim 1 wherein said acrylate is hydroxyethyl methacrylate.

3. The hydrophilic polyurethane acrylate composition of claim 1 wherein said acrylate is methyl methacrylate.

4. The hydrophilic polyurethane acrylate composition of claim 1 wherein said acrylate is methyl acrylate.

5. The hydrophilic polyurethane acrylate composition of claim 1 wherein said acrylate is about 17 weight percent of said composition.

6. The hydrophilic polyurethane acrylate composition of claim 5 wherein said acrylate is hydroxyethly methacrylate.

7. The hydrophilic polyurethane acrylate composition of claim 1 wherein said polyurethane resin is derived from a mixture of polyols and a diisocyanate.

8. The hydrophilic polyurethane acrylate composition of claim 7 wherein one of said polyols is a polyol having a number average molecular weight of 8,000.

9. The hydrophilic polyurethane acrylate composition of claim 1 which has been molded to form a desired shape.

10. A method of preparing an alcohol soluble hydrophilic polyurethane acrylate composition which comprises reacting from about 10 to about 50 parts by weight of a monoacrylate in the presence of from about 100 parts by weight of a hydrophilic polyurethane resin having an NCO/OH ratio of 0.85/1 to 1/1.

11. The composition of claim 1 wherein the polyurethane resin has a number average molecular weight of about 18,000 to 24,000.

12. The method of claim 10 wherein the polyurethane resin has a number average molecular weight of about 18,000 to 24,000.

* * * * *